Dec. 16, 1969  W. E. YOUNG ET AL  3,484,855
APPARATUS FOR BONDING PLASTIC
Filed Sept. 16, 1968  4 Sheets-Sheet 1

INVENTORS
WILLIAM E. YOUNG
ROBERT O WOLFELSPERGER
PATRICK J. PINTO
BY Ralph R Roberts
AGENT Dec. 16, 1969  W. E. YOUNG ET AL  3,484,855
APPARATUS FOR BONDING PLASTIC
Filed Sept. 16, 1968  4 Sheets-Sheet 2

INVENTORS
WILLIAM E. YOUNG
ROBERT O. WOLFELSPERGER
PATRICK J. PINTO
BY Ralph R. Roberts
AGENT INVENTORS
WILLIAM E. YOUNG
ROBERT O. WOLFELSPERGER
PATRICK J. PINTO
BY Ralph R Roberts
AGENT Dec. 16, 1969   W. E. YOUNG ETAL   3,484,855
APPARATUS FOR BONDING PLASTIC
Filed Sept. 16, 1968   4 Sheets-Sheet 4

INVENTORS
WILLIAM E. YOUNG
ROBERT WOLFELSPERGER
PATRICK J. PINTO
BY Ralph R. Roberts
AGENT United States Patent Office 3,484,855
Patented Dec. 16, 1969

3,484,855
APPARATUS FOR BONDING PLASTIC
William E. Young, 52 Sea Beach Drive, Stamford, Conn. 06902, and Patrick J. Pinto, Freehold, and Robert O. Wolfelsperger, Fairfield, N.J.; said Wolfelsperger and said Pinto assignors to said Young
Continuation-in-part of application Ser. No. 489,574, Sept. 23, 1965. This application Sept. 16, 1968, Ser. No. 762,270
Int. Cl. B32b 31/18, 35/00
U.S. Cl. 156—513                                              14 Claims

ABSTRACT OF THE DISCLOSURE

Apparatus for joining at least two plies of thermoplastic material to one another at portions other than their edges. The apparatus includes means for holding a plurality of thermoplastic sheets on a cooled support platen which is maintained at a temperature less than the melting point of the thermoplastic sheets being joined. A heated plunger having a flat tip end is advanced at a predetermined rate into the thermoplastic material, the heated tip melting the plastic and as the tip advances commingles the melted plastic. The advance of the heated plunger is stopped when the tip has entered at least part way into the bottommost layer of material. The heated tip is then withdrawn and the melted portion of plastic is cooled to provide a tubular weld.

REFERENCE TO RELATED APPLICATIONS

This application is a continuation-in-part of U.S. Patent 3,402,088 issued Sept. 17, 1968, and contains claimed material subject to restriction in application Ser. No. 489,574 filed Sept. 23, 1965, which resulted in this patent.

BACKGROUND OF THE INVENTION

Field of the invention

This invention relates to the class of Adhesive Bonding and Miscellaneous Chemical Manufacture and more particularly to the subclass of "bonding of facing continuously contacting laminae at spaced points."

Description of the prior art

Certain controllable plastic behavior was observed in the preparatory work and experiments necessary to perfect the technique for edge sealing of thermoplastic material, the method and apparatus pertaining thereto being disclosed in U.S. patent applications Ser. No. 342,020 filed Feb. 3, 1964, now Patent No. 3,342,817 and Ser. No. 342,302 filed Feb. 3, 1964, now Patent No. 3,388,021. Many tests and controlled experiments have proved the practical means for heated plunger sealing of thermoplastic laminae in which controlled "counterflow" of melted plastic is used to seal plastic sheets at other than their edges.

Heretofore joining of thermoplastic sheets of uneven thicknesses and of dissimilar material has required very elaborate preparation of the contacting surfaces and often additional and/or auxiliary material. The resulting joint has all too often proved unreliable and of low strength. In particular the joining or bonding of plastic sheets, mouldings or extrusions of different thicknesses has been most troublesome where the heat for joining these members must be supplied through the thicker member. This arrangement is often necessary because of the configuration of the sealing members, apparatus arrangement or of the sequential placement of the plastic laminae. Of additional note is the prior difficulty of joining sheets of different plastic materials to one another. Materials such as polyethylene and polypropylene either or both of which may be coated with Saran (polyvinylidene chloride) film are by present methods joined to produce weak seals when the Saran is on the side of the sheets to be sealed to each other.

SUMMARY OF THE INVENTION

The invention consists in the novel apparatus herein shown and described and in a broad aspect includes a metal plunger which is of a preselected size and configuration, said plunger being brought to and maintained at a predetermined temperature. Two or more sheets of thermoplastic are brought into plied relationship and are maintained in a controlled relationship with each other. The plunger, heated to a temperature in excess of the melting point of the plastic, is then advanced at a selected speed into and through all but the bottom ply of plastic sheets. The plunger enters but is stopped short of passing through the bottom ply of plastic. In the course of advancement, the distal flat end of the heated plunger, moving at a controlled and selected speed, melts the thermoplastic material in contact with and in close proximity to the flat face and sides of the advancing plunger. By supporting the material to be joined on a cool platen or plate, and by stopping the plunger short of this platen, the melted plastic displaced by the advancing plunger is moved upwardly and outwardly in a counterflow direction. The cool platen may also be made to serve as a positive stop for the advancing plunger since the cool platen will maintain between the face of the plunger and platen a contiguous separating film of plastic on the platen's plastic supporting surface. The plies of material, if thin, are held by a plate having apertures therein. This plate is spaced from the bottom platen in a manner such that each ply of material will be held in close proximity to each other yet will not be so tightly pressed that the viscous fluid plastic is prevented from flowing a short distance between plies. Where the top ply is a heavy plastic sheet, as for example, one-sixteenth of an inch, the top ply may be held by other clamp means and the top ply as it is pierced by the plunger will provide and act as an apertured plate.

In operation, the heated plunger is advanced through an aperture in the clamping plate or is advanced to and through the heavy top ply. Upon entering the second and successive plies the plunger, as it melts the plastic, also displaces the plastic and causes it to flow upwardly and also outwardly a short distance between plies. The cool support plate or platen insures that the displaced fluid plastic will only flow upwardly and/or outwardly and as the fluid flow of plastic is more or less confined, the fluid flow will exert a certain amount of hydraulic pressure during the flow thereof. Under the influence of the hydraulic pressure the fluid plastic will flow outwardly from the plunger and between the plies of sheets and upwardly around the plunger. Such a flow is here defined as "counterflow" and during the flow thereof the molten plastic derived from the several plies commingles and forms, for all practical purposes, a homogeneous plastic bond which, when the plunger is withdrawn, solidifies and forms a strong bond with each ply and with itself. Contamination of surfaces by dirt and other material has little or no effect on the joining of the plastic laminate by this method. The stream of molten plastic under pressure either washes or pushes the contaminants out of the way or encapsulates the contaminants. In the case of Saran surfaced polypropylene the Saran is readily pushed from the path of the heated plunger. Seals of moderate strengths as by the method of this invention have also been obtained between sheets of polyethylene where a lamina as dissimilar as fifty gauge oriented polyester film has been interposed. Seals may also be made by this method between certain thermosetting plastics while they are still in their thermoplastic state.

By selectively spacing the applications of the plunger to the plies of plastic it is possible to form a hermetically sealed joint. The shape of the plunger can be formed so as to provide any desired pattern of sealing or bonding.

It is also possible that the plies of plastic to be joined may be so thick that a plunger having a desired small configuration will be unable to sustain a desired temperature at the tip as said tip is advanced into the plastic. When the heat in the tip becomes too far reduced the plunger will be unable to penetrate the plastic at the desired rate. When this becomes the situation, the design of the joining apparatus and the method of joining can include opposed heated plungers each advancing toward the other through opposite sides of the plastic pile, each plunger being advanced at a selected speed and including means to limit its advance to a preselected point.

It is an object of this invention to overcome the above problems and to provide apparatus for the joining or bonding of laminae of thermoplastic material. It is a further object to provide apparatus for the joining or bonding of thermoplastic laminae of dissimilar thicknesses and/or dissimilar compositions.

It is a further object of this invention to provide an apparatus for the joining or bonding of thermoplastic sheets arranged in multi-layers which may be of dissimilar thicknesses and with no special preparation of the surfaces of the sheets to be joined.

There has thus been outlined rather broadly the most important features of the present invention in order that a detailed description thereof that follows may be better understood and in order that the present contribution to the art may be better appreciated. The invention itself, however, both as to its organization and method of operation, together with further objects and advantages thereof, may best be understood by reference to the following description taken in connection with the accompanying drawings, in which:

Figure 1:
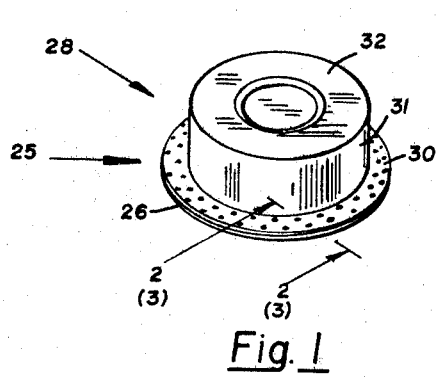
FIG. 1 represents an isometric view of a plastic outer wrap or package wherein two plastic members are joined by the method and apparatus of this invention.
Figure 2:
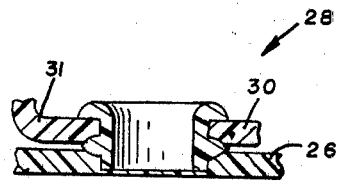
FIG. 2 represents a fragmentary view showing in section a joined portion of the package of FIG. 1, the package being formed of two relatively heavy plastic sheets and the view taken on the line 2—2 of FIG. 1.
Figure 3:
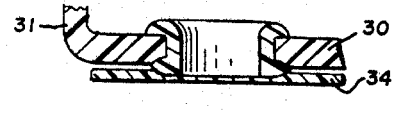
FIG. 3 represents a fragmentary sectional view similar to that of FIG. 2 and taken on the line 3—3 of FIG. 1, the package being formed from a thick upper and a thin lower plastic sheet.

Referring now to the drawings wherein similar characters designate corresponding parts throughout, there is shown in FIGS. 1–3 a highly successful method of packaging a reel or coil of wire. In this commercial reduction to practice the overwrap or package as assembled and designated 25 and seen in FIG. 1 is, in commercial use, adapted to encapsulate a coil of wire arranged to be paid out while the operator is walking or being transported at various speeds. As exemplified, and seen in FIG. 2, a base member 26 is of a relatively flat configuration while the cover member 28 is a shaped piece of thermoplastic having a flange portion 30 from whence upwardly extends a cylindrical portion 31 terminating in an end or cover extending portion 32 which may have its central portion depressed a small amount. This cover conforms closely to the coil of wire being packaged as it has been found highly satisfactory to heat and vacuum form cover 28 over the coil of wire while still warm and pliable, then join flange portion 30 and base member 26. In the process of joining, base member 26 and flange 30 are brought into face-to-face relationship and a heated plunger is advanced into the plies of plastic, the heated plunger as it is advanced being used to form the weld in a novel manner to be hereinafter more completely described.

In FIG. 3 the base member 26 (FIG. 2) has been replaced by a thinner base member 34. This new base member is perhaps one-half or less the thickness of flange portion 30. As in FIG. 2 a heated plunger is used to make the weld to be hereinafter described in detail.

Figure 4:
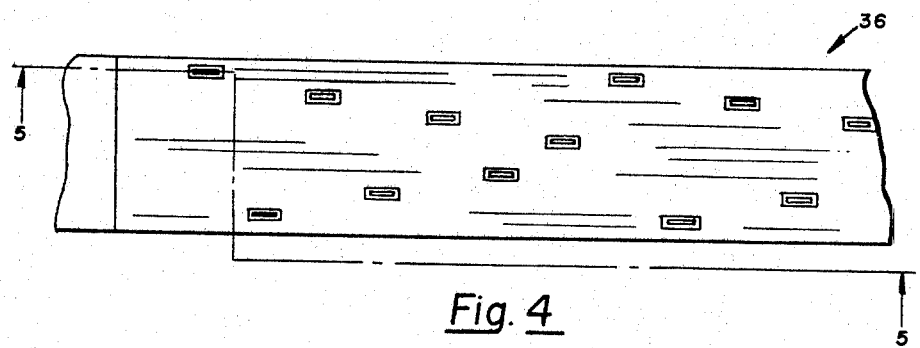
FIG. 4 represents a plan view in slightly enlarged scale of a plastic strap joined by the method and apparatus of this invention.
Figure 5:
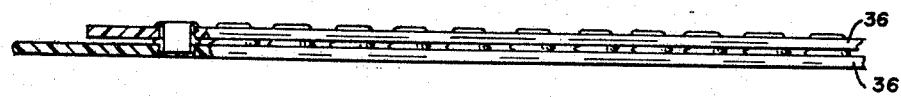
FIG. 5 represents a side view of the strap of FIG. 4 with a portion taken in section, the view taken on the line 5—5 of FIG. 4.
Figure 6:
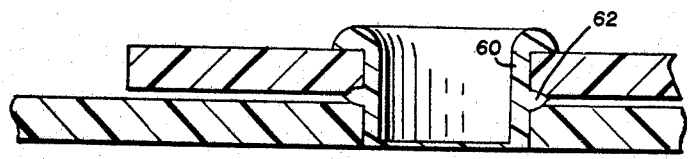
FIG. 6 represents a greatly enlarged sectional view of one of the joined portions shown in FIG. 4.

In FIGS. 4–6 is shown another practical commercial application of this invention in which a band or strip of thermoplastic 36 is lapped upon itself. As reduced to practice, the band is of highly oriented polypropylene whose base material may be supplied by Hercules Powder Co., Inc., of Wilmington, Del. A plurality of spaced applications by a heated plunger provides a selected number of bonds, which bonds are oriented in respect to each other and also in the direction of orientation of the polypropylene so as to give a precise effect. In this particular application the oriented polypropylene is nominally one-half inch wide and twenty thousandths of an inch thick. In this particular plastic and application the oriented polypropylene has a tensile strength of about sixty thousand pounds per square inch resulting in a band or strap having a breaking strength of about six hundred pounds. The selective joining, as shown, results in a joined strap having a pull strength of about two hundred to four hundred eighty pounds or more. If sealing temperature heat is allowed to penetrate into other than the joining areas of the band 36 the strength of the oriented polypropylene is lost and a tensile of about eight thousand pounds per square inch after cooling is the result. Such a strap results in a band having a strength of about eighty pounds and as a strap for packaging is very weak and usually quite unsatisfactory.

The method of joining sheets, moldings, and other lamina of thermoplastic in accordance to the teachings of this invention is shown in FIGS 10–20. In the sequence here shown for the purpose of illustration, a cool bottom platen or plate 40 carries a bottom sheet or ply 42 of thermoplastic. This sheet 42 may be of polyethylene or polypropylene and may be at least as thick as eighty thousandths of an inch. Immediately above ply 42 are four thinner plies 44, 45, 46 and 47, said plies are also of thermoplastic, and for the purposes of illustration are shown about one-fifth the thickness of ply 42 whereas, in practice, these plies may be even less than one-thousandth of an inch thick. A top ply 48 similar to ply or sheet 42 lies on ply 47. An optional clamp plate 50, seen in phantom outline in FIG. 11, may be used to maintain a predetermined spacing between those plies between said upper clamp plate and the bottom cool platen 40.

Figure 11:
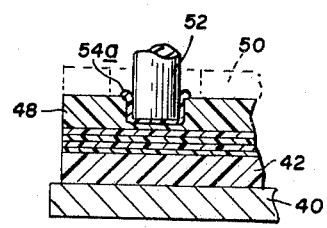
FIG. 11 represents a diagrammatic fragmentary cross section showing in phantom outline an apertured clamp plate resting on the plies of plastic and with a heated plunger having been advanced into the top ply of plastic.

A heated plunger 52 has a flat end and is preferably maintained at a temperature from one to three hundred or more degrees F. above the flowing temperature of the plastic laminae to be joined. This plunger seen in FIGS. 11–18A has in FIG. 11 been advanced through an aperture in plate 50 or has been advanced directly to the top thermoplastic ply 48. This plunger is controlled in its rate of advance which control may be by conventional apparatus such as a hydraulic cylinder or, if desired, consist of no more than a weight applied to the plunger. Other advancement apparatus includes springs or reversible electric motors. As seen in FIG. 11, the heated distal end of the plunger has contacted the ply 48 and has melted the portion of thermoplastic material immediately in contact with the side and distal flat end of the plunger 52. As shown in FIG. 11, viscous thermoplastic material extends across the end of the plunger and as the plunger advances into the ply 48 the displaced viscous thermoplastic material flows up the side of the plunger and, as designated 54a, forms a small bead around the periphery of the plunger The advance of the plunger is by limit stops such as a collar on a rod or an abutment in way of a lever or arm.

Figure 12:
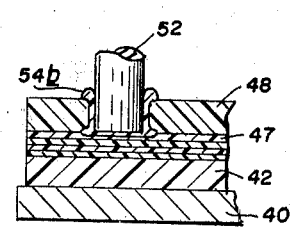
FIG. 12 represents a diagrammatic fragmentary cross section of the plastic plies and platen of FIG. 10 and with the heated plunger having been advanced through the heavy top ply of plastic.

In FIG. 12 the plunger 52 has been advanced to a point where plies 47 and 48 lie in face-to-face contact. The viscous melted plastic not only continues to flow up the sides of plunger 52 but now some usually flows outwardly from the plunger into the juncture of the two plies. Note that the bead around the plunger has increased through "counterflow" of the viscous plastic material up the sides of the plunger while the rest of the viscous material is disposed in the juncture of the laminae. At this stage of forming the melted plastic is desginated 54b.

Figure 13:
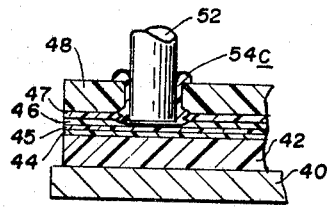
FIG. 13 represents the cross-sectional view of FIG. 12 with the heated plunger having been advanced through the first of four thin plies of plastic.

In FIG. 13 the flat end of the heated plunger 52 has been advanced to a point where plies 46 and 47 lie in face-to-face contact. The viscous melted plastic under hydraulic pressure continues to flow up the sides of the advancing plunger 52 but now through the hydraulic pressure exerted by the advancing plunger pushes viscous melted plastic into the juncture of plies 48 and 47 and plies 47 and 46 while the bead continues to increase in size and is designated 54c.

Figure 14:
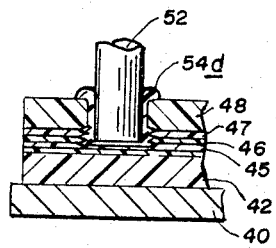
FIG. 14 represents the cross-sectional view of FIG. 13 with the heated plunger having been advanced through the second of four thin plies of plastic.

In FIG. 14 the heated plunger 52 has been further advanced to a point where the distal end of the plunger is at the juncture of plies 46 and 45. The viscous melted plastic under hydraulic pressure continues to flow up the sides of the advancing plunger forming bead 54d and additionally, by hydraulic pressure, tends to push the viscous melted plastic into the junctures of plies 48 and 47, 47 and 46, and the new juncture of 46 and 45. It is to be noted that the "counterflow" of melted plastic from each ply causes intermingling of the plastic, making the resulting melted portion relatively homogeneous.

Figure 15:
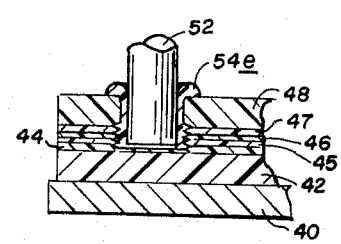
FIG. 15 represents the cross-sectional view of FIG. 14 with the heated plunger having been advanced through the third of four thin plies of plastic.

In FIG. 15 the heated plunger 52 has been advanced to a point where the distal end is at the juncture of plies 45 and 44. As above, the hydraulic pressure created by the advancing plunger causes "counterflow" into the juncture of plies 48–47, 47–46, 46–45 and 45–44. The bead around the plunger continues to grow and in this FIG. 15 is identified as 54e.

Figure 16:
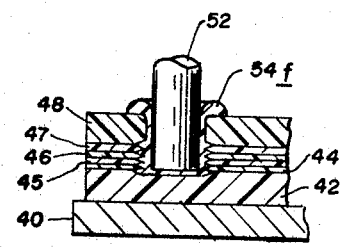
FIG. 16 represents the cross-sectional view of FIG. 15 with the heated plunger having been advanced through the fourth of four thin plies of plastic.

In FIG. 16 the heated plunger 52 has been advanced to the juncture of plies 44 and bottom ply 42. The hydraulic pressure on the viscous melted plastic is maintained by the advancing plunger, which pressure tends to cause viscous plastic to flow into all separations of the plies and to continue "counterflow," causing an increase in the bead designated 54f.

Figure 17:
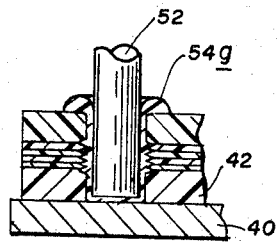
FIG. 17 represents the cross-sectional view of FIG. 16 with the heated plunger having been advanced in the bottom heavier ply of plastic to a point near the cool support platen.

In FIG. 17 the heated plunger 52 has advanced to a point where the distal flat end is near the cool platen 40. This platen being at a temperature less than the melting point of the plastic will have a tendency to prevent complete melting of the plastic that is contiguous to the platen. By keeping unbroken the bottom surface of the bottom ply while the plunger 52 is advanced into the plies of plastic, the confined movement of melted viscous plastic under hydraulic pressure will tend to flow between the plies or in "counterflow" movement upwardly around the plunger. It is to be noted that the platen 40 can be used as a positive stop for the advancement of the plunger. In practice, the cool platen always insures that at least some thin film of plastic is unmelted and will act as a cushion barrier stop.

Figure 18:
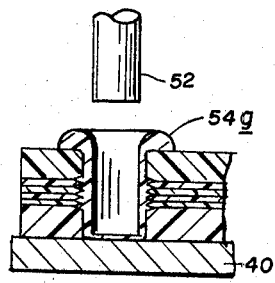
FIG. 18 represents the cross-sectional view of FIG. 17 but with the heated plunger withdrawn from the plastic plies.

FIG. 18 shows the heated plunger 52 withdrawn from the stack of plastic laminae. The plunger being at a substantially higher temperature than the melting point of the plastic, said plunger is in effect self-cleaning and is easily withdrawn. The resulting bead 54g and relatively homogeneous tubular melted plastic is then allowed to cool, forming a tubular weld of commingled plastic.

Figure 18A:
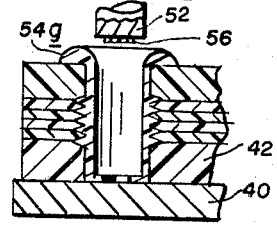
FIG. 18A represents the cross-sectional view of FIG. 17 but with the heated plunger withdrawn from the plastic plies and with a portion of the plastic film of the bottom ply being shown adhered to the end of the withdrawn plunger.

It is to be noted in FIG. 18A that on occasion when the heat source for the heated plunger 52 is at a substantial distance from its distal tip, the heated tip portion of plunger 52 when brought adjacent the cooled platen 40 may be cooled sufficiently so that an end portion 56 of plastic may adhere to the tip of plunger 52 as it is removed from the welded stack of plastic. Since the removal of the plunger 52 from the plastic stack is after the hydraulic flow of viscous material forming the weld has been completed, the disruption of the bottom surface of ply 42 is after the fact and does not affect the prior formed plastic weld.

It is to be noted that for the purpose of illustration and explanation the FIGS. 2, 3, 6 and 9 through 23 inclusive, show an interface line between the plies and weld. This interface line and the various cross-hatchings show a joint which is only a suggestive point of homogeneous juncture of the welding of the weld and the plies. In FIG. 2, for example, the lines and cross-hatching showing plies 26, 30 and the weld actually is a homogeneous mingling of ply 30 to the weld and ply 26 to the weld. There is actually no joint in the weld material between the plies and the weld to the plies as it is an intent of this invention to provide a weld that is homogeneous with the plies and the weld. The weld and plies joined in this manner is intended to be as strong as the material welded and any interfaces accidentally formed are of short and irregular formation and duration.

Figure 19:
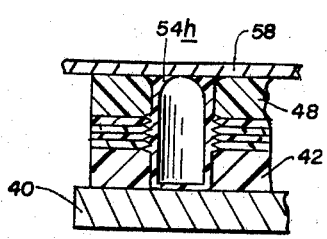
FIG. 19 represents the cross-sectional view of FIG 18 with a cool press plate engaging the counterflow bead of plastic extending above the top ply of plastic, the press plate having pushed the bead into the cavity formed by the withdrawn plunger.
Figure 20:
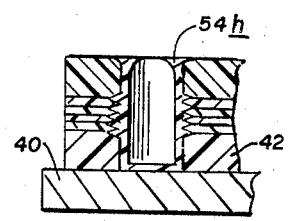
FIG. 20 represents a cross-sectional view of the joined plastic sheets of FIG. 19 as seen in a finished condition.

On occasion it is desirable to smooth the top surface of the top ply 48 subsequent to the withdrawal of the plunger from the just formed weld. One method of smoothing the weld is shown in FIG. 19 wherein a plate 58 preferably of cooled metal is pressed downwardly onto the upper surface of top ply 48 whereby bead 54 is urged into the cavity formed by the withdrawn plunger, said bead taking the form 54h as seen in FIG. 19. After removal of the plate 58 the weld will appear similar to FIG. 20. The smoothing of the weld is usually while the bead 54 is still in a heated conditon and most easily moved.

Referring once again to FIGS. 2–3, it is to be noted that the plunger 52 or a similarly heated plunger can make the weld of FIGS. 2 and 3. In FIG. 2 the members 26 and 30 may be of either polypropylene and/or polyethylene either or both of which may have a Saran or similar coating on their facing surfaces. The thicknesses of each of these members may vary from twenty or less to more than eighty thousandths of an inch thick. In FIG. 3 is shown the application whereby the top flange 30, as reduced to practice, is eighty thousandths of an inch thick and the thinner base member 34 is thirty thousandths of an inch thick. It is to be noted that to facilitate assembly the plunger is first moved through the thicker flange piece 30.

In FIGS. 4–6 the heated plunger is a plurality of rectangularly shaped heated metal pins arranged in a precise pattern so that no two plunger welds are in the same transverse pattern. In one instance of the practical application of this invention shown in these FIGS. 4–6, the plungers are one-thirty second inches wide by one-eighth inches long. The wall 60 (FIG. 6) of the weld made in the oriented polypropylene is estimated at about one-sixty-fourth inches. The lateral fin 62 may extend about another sixty-fourth into the space between the lapped portions of band 36.

Figure 7:
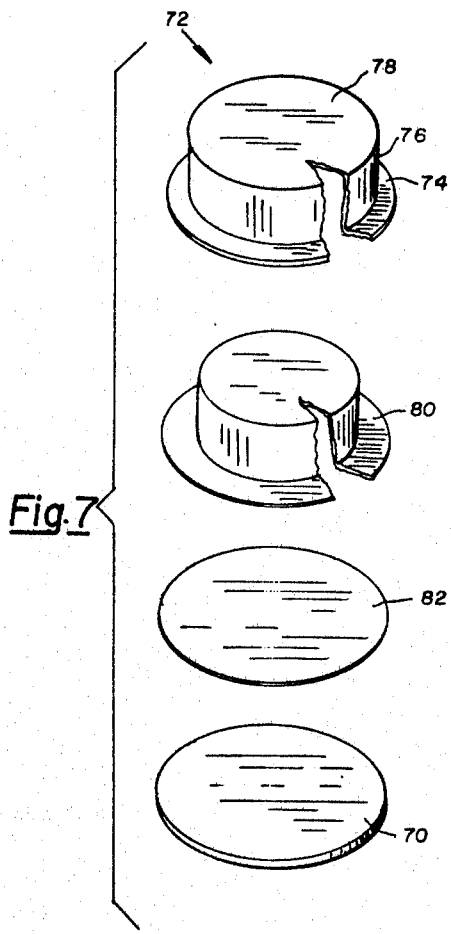
FIG. 7 represents an exploded isometric view of a plurality of sheets of plastic arranged to be joined to form a hermetically sealed package similar to the package of FIG. 1.

In FIG. 7 is shown a modification of the package of FIG. 1. Base member 70 is like base member 26 and cover member 72 is like cover member 28 with a corresponding flange portion 74, cylindrical portion 76 and end cover 78. In this particular application it is desired to make the package hermetically sealed to prevent water from entering the package and subsequently in storage and use becoming frozen with the ice so formed perhaps damaging the package or the wire encapsulated therein or interfering with its unwinding. An optional thin cover member 80 formed to fit inside cover member 72 is made of polyethylene or other suitable material of about ten thousandths of an inch in thickness. A cover member 82 also of polyethylene and about ten thousandths of an inch thickness is of a diameter suitable to fit between flange 74 and base 70. The wire may be placed on base member 82 and cover member 80 attached thereto. This assembly may then be placed in cover member 72 and with the flange portions of the cover members 72 and 80 lying on base members 82 and 70, the four thicknesses of plastic are brought into face-to-face relationship and heated plungers applied in the manner of FIGS. 10–20 to form joined portions.

Figure 8:
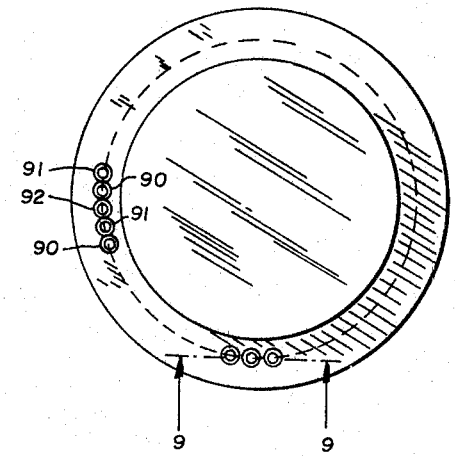
FIG. 8 represents a plan view of a package assembled from the components shown in FIG. 7 and joined by the method and apparatus of this invention.
Figure 9:
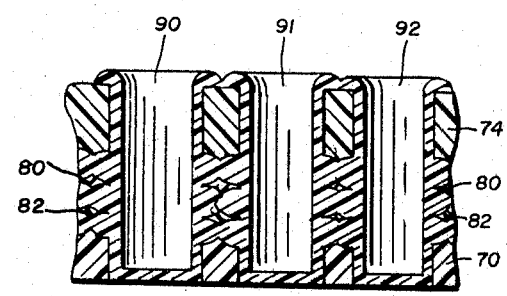
FIG. 9 represents an enlarged sectional view taken on the line 9—9 of FIG. 8 and showing the method of forming a hermetic seal.

In the plan view of FIG. 8 is seen a circular pattern of plastic welds arranged in sequence and close proximity to each other so as to intermingle and form a hermetic seal. As an exemplification of a typical application, the pattern of plastic welds 90, 91 and 92 are repeated around the flange portion of the package to form a complete circular path. This complete pattern of welds can be formed in one operation by having a circular row of heated plungers arranged to provide the pattern 90, 91, 92 and repeat this pattern as many times as necessary to complete the circle. This pattern can also be formed by one or more spaced plungers. If a single plunger were to be used, alternate welds 90, 92, etc. could be made around the flange and then the intermediate welds 91 could be made to form the commingled welds as shown in the enlarged view of FIG. 9. The sequence of welds shown in FIG. 8 often are made in two steps whereby a circle of spaced and heated plungers form a circle of welds 90 and 92. When welds 90 and 92 are completed, the plungers are advanced to intermediate positions by rotating the piece or apparatus. Weld 91 is then made intermediate each of the welds 90–92 and as they are made the plunger exerts pressure to flow the basic laterally until stopped by welds 90–92. The series of commingled plastic welds seen in section in FIG. 9 forms a hermetic seal when the plastic flows between members 74–80, 80–82 and 82–70. When arranged in close proximity to each other the sequence of welds 90, 91 and 92, etc. provide interconnected lateral connections which, as exemplified, are three layers of interconnected rings.

Figures 21, 22:
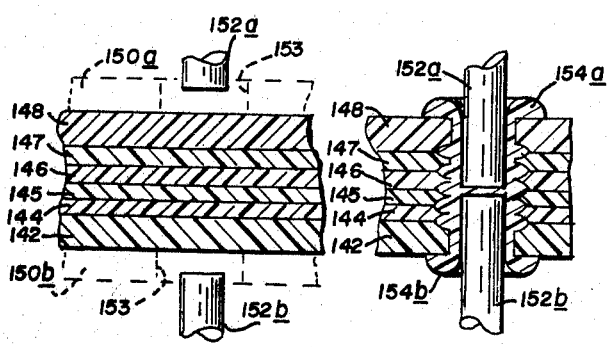
FIG. 21 represents a fragmentary sectional view of an array of plastic sheets or plies prior to joining by a pair of opposed heated plungers.
FIG. 22 represents a fragmentary sectional view of the plastic plies of FIG. 21 and with the opposed plungers substantially at their limit of advance.
Figure 23:
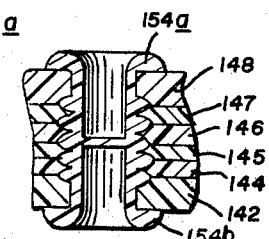
FIG. 23 represents a fragmentary sectional view of the completed weld of the plastic assembly of FIG. 22 and with the opposed plungers withdrawn from the weld.
Figure 10:
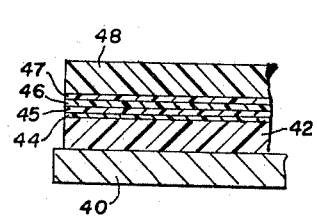
FIG. 10 represents a diagrammatic fragmentary cross section showing multi-layers of plastic arranged for joining and lying on a cool platen.

FIGS. 21–23 illustrate a solution to a problem that may arise when the plunger is limited in size and/or of extended length. This limitation may occur for any number of reasons, among which are aesthetic appearance or design considerations. The small plunger of extended length, as it is advanced into the plastic plies, does lose heat from the tip of the plunger to the surrounding plastic. This heat loss may cool the plunger tip to a temperature at or below the melting point of the thermoplastic whereupon the plunger is unable to advance into the plastic. In FIGS. 21–23 is shown an arrangement in magnified scale in which opposed plungers are advanced toward each other. These plungers designated 152a and 152b as arranged in FIG. 21 are disposed to move toward each other through apertures 153 which are provided in upper clamp plate 150a and lower clamp plate 150b shown in phantom outline. As seen in FIG. 21 the bottom ply 142 similar to thermoplastic ply 42 carries four thinner plies 144, 145, 146 and 147, which plies are similar to thermoplastic plies 44, 45, 46 and 47 in FIG. 10. A top ply 148 is similar to top ply 48 and is held in a selected position by upper clamp plate 150a.

As seen in FIG. 22, each of the plungers 152a and 152b have been advanced toward each other, the advance being stopped at a point near the center of the plies of thermoplastic. As each of the advancing plungers acts as a platen for the other plunger, so as in the manner of the method of FIGS. 10–20, is the flow of molten viscous plastic limited to the "counterflow" up the sides of each plunger 152a and 152b and to the flow of viscous molten plastic into the junctures of the plies 148–147, 147–146, 146–145, 145–144 and 144–142. A portion of the molten plastic not forced into these junctures form upper and lower beads 154a and 154b and in the manner of FIGS. 10–20 can be smoothed or left as formed. The resulting weld shown in FIG. 23 is merely an illustration of the forming of one weld in which a symmetrical arrangement of plastic laminae and equal size plungers results in a symmetrical weld. Because of design considerations or a different arrangement of plies, it may be desirable to form an unsymmetrical weld. This form of unsymmetrical weld may be necessary because of physical factors such as the design of the package requiring a selected disposition of the setrength ply or the strain exerted on the weld by the article being packaged requires the strength of the weld to be selectively placed. The apparatus controlling the penetration of the plungers 152a and 152b can be arranged to provide a limit to the advance of each plunger so as to satisfy the particular condition of weld desired or required.

Figure 24:
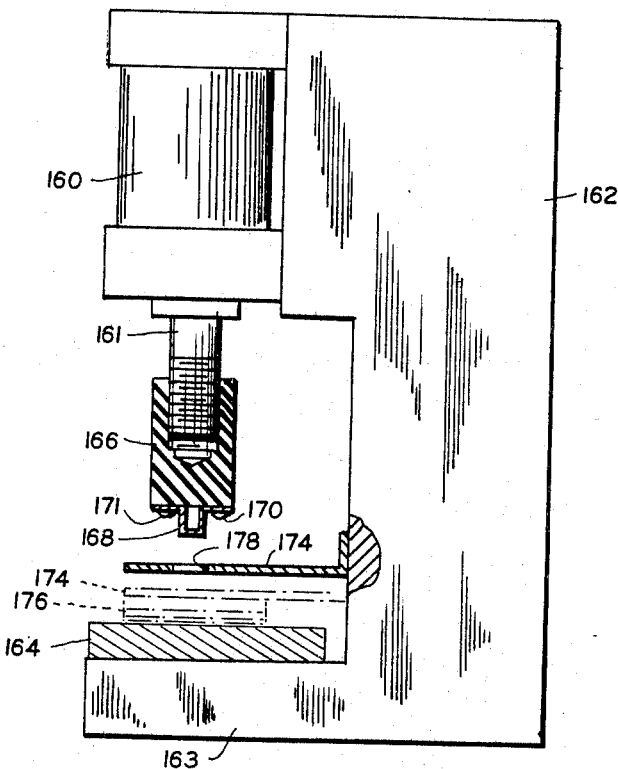
FIG. 24 represents a general arrangement of apparatus for welding the plies of plastic, the plunger tip being a resistance element.

Referring next to FIG. 24 and the apparatus disclosed therein, a conventional cylinder 160 has a piston rod 161 movable to a forward or downward limit and also movable to a retracted or up condition by pneumatic or hydraulic means not shown. This cylinder is carried on a frame 162 having a forwardly extending base portion 163. A cooled platen 164 is removably mounted on this forwardly extended base and is of a thickness to establish a determined plane. Carried on the end of rod 161 is a plunger member which includes an insulating head 166 removably threaded onto the end of the rod.

Mounted on the bottom end of head 166 is a heatable tip 168 which, as shown, is a resistance element adapted to be heated to a desired temperature by feeding electric current to and through the element. Screws 170 and 171 may not only serve as means for retaining the tip to head 166 but may also serve as screw posts for the connecting of electrical conductors thereto. Tip 168 is a strip bent to provide an extending channel-shaped configuration shown. The cross bar portion of the channel shape of the attached tip is parallel to the upper surface of the platen 164. The sides of the channel are parallel to each other and are normal to the plane of the cross bar portion. A clamp plate 174 is carried on and extends from the column portion of the frame 162. This clamp plate is adjustable to move towards and to the plies of plastic 176 indicated in phantom outline. This clamping action is manual or automatic by means well known in the art. An aperture 178 is provided for the passage therethrough of the tip 168 as it forms the weld.

Figures 25, 26:
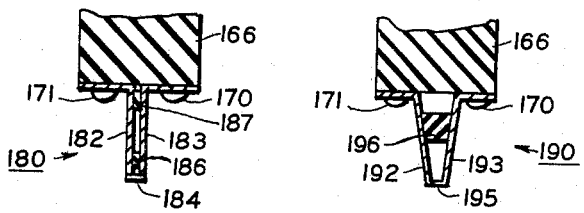
FIG. 25 represents an alternate shape of a plunger tip made of a resistance element.
FIG. 26 represents yet another plunger tip configuration made from a resistance element.

An alternate tip is shown in FIG. 25 wherein a tip 180 is of a narrow configuration. This tip is of a resistance metal and whereas it may be difficult to bend into the configuration shown, the tip is of soldered construction. Angles 182 and 183 are arranged in opposite pairs and at their lower end are joined by cross bar 184 soldered or brazed to the ends of the downwardly extending legs of the angles. Insulating block members 186 and 187 are disposed to stiffen the tip and prevent the legs from touching one another.

Yet another tip 190 is shown in FIG. 26 wherein the tip of resistance metal is formed so that the downwardly extending side members 192 and 193 are slightly sloped toward each other to prevent side deflection. Bottom cross bar portion 195 is integral with the side members or may be a separately soldered member. To provide greater or lesser heat, the cross bar portion 195 may be made thicker or thinner to increase or decrease the resistance to current flow. An insulator and stiffener block is provided to retain the sides in the desired disposition.

Referring again to FIG. 24, the downward movement of piston rod 161 carries the heated tip to a lower limit whereat the cross bar portion of the tip is at a determined position adjacent the platen 164 to produce a weld in the manner above-described.

USE AND OPERATION

In particular the apparatus for sealing plies of plastic as exemplified in the various figures provides for the plies of plastic to be laid in face-to-face relationship to one another and to be retained in a restricted yet not tightly pressed relationship to one another. In particular, as shown and described above, the top outermost ply of thermoplastic is usually of heavier gauge than the lower or intermediate plies or at least some of the lower plies. The plies of thermoplastic being welded may be dissimilar both as to material and/or thickness. In forming the weld described above, the use of a heated plunger whose distal tip temperature is about six to seven hundred degrees F. provides for melting and viscous flow of commingled plastic in "counterflow" to the advancement of the heated plunger. This novel "counterflow" by hydraulic pressure exerted on the viscous melted plastic permits the joining of somewhat dissimilar plastics and obviates the necessity of controlled cleaning of surfaces and other conditions usually of great influence in the joining or sealing of plastics.

The plungers used in the commercial applications of this invention are usually of aluminum, nickel or steel and are electrically heated to temperatures of six hundred or more degrees Farenheit. Such heated plungers prove to be self-cleaning on the common thermoplastics such as polyethylene and polypropylene.

The apparatus and product of fastening thermoplastic plies to each other requires relatively conventional apparatus arranged to produce the novel weld described above. In this description the terms "up," "down," "bottom," "lateral" and similar terms are applicable to the apparatus and product described in conjunction with the accompanying drawings and it is to be noted that such terms are merely for the purpose of description and do not necessarily apply to a position in which the apparatus and product may be constructed or used.

While we have herein shown and described our invention in what we have conceived to be the most practical and preferred embodiments, it is recognized that departures may be made therefrom within the scope of our invention. Having described our invention herein, what we claim as new and desire to secure by Letters Patent is:

1. Apparatus for joining at least two plies of thermoplastic material to one another at portions other than their edges, said apparatus comprising (1) a support platen adapted to support a plurality of plies of plastic while being joined, the support platen being operated at a temperature less than the melting point of the thermoplastic sheets being joined, (2) means for holding the plies of thermoplastic material on the support platen and in substantially face-to-face relationship, (3) a plunger having a substantially flat face and adapted to move toward and away from the plies of thermoplastic sheets when said sheets are carried on the support platen, (4) means for limiting the advancement of the plunger to a point which is at least no further than engagement with the platen, (5) means for heating the exterior tip portion of the plunger to a higher temperature than the melting temperature of the thermoplastic sheets, (6) means for advancing the heated tip of the plunger at a predetermined rate into the held plies of plastic whereby the heated tip will melt the contacted plastic and as the tip is advanced the melted plastic will be displaced causing a counterflow of the melted plastic up the sides of the plunger tip, the flowing plastic commingling, and (7) means for moving the heated tip from the melted plastic of the plied sheets whereby when the melted plastic is permitted to cool the commingled plastic will form a mixed plastic tubular weld extending from near the bottom of the ply on the platen to and above the top ply, the weld fused to the portions of plastic plies adjacent the tubular weld.

2. Apparatus as in claim 1 wherein the counterflow of displaced melted plastic as it flows up the plunger is simultaneously forced into such voids as exist between the plies of plastic, this weld portion extending a short distance into the space between the plies and upon cooling becoming essentially homogeneous with the plastic plies.

3. Apparatus for joining at least two plies of thermoplastic material to one another at portions other than their edges, said apparatus comprising (1) means for supporting a plurality of plies of thermoplastic material while the plies are being joined to one another, (2) means for holding the plies of material in a prearranged position and spacing on the support means, the plies being disposed in substantially face-to-face relationship, (3) at least one plunger having a substantially flat face and adapted to move toward, into and away from the plies of thermoplastic material when said plies are carried on the support means, (4) means for limiting the rate of movement of each plunger and the extent of travel of each plunger toward, into and away from the plies of thermoplastic material, (5) means for heating the distal tip portion of each plunger to a temperature higher than the melting temperature of the thermoplastic plies, and means for moving the heated tip of each plunger at a predetermined rate of travel into the held plies of thermoplastic material whereby the heated advancing tip will melt the contacted plastic and as the tip is advanced the melted plastic will be displaced causing a counterflow of the viscous melted plastic up the sides of the plunger and laterally into such voids as may exist between the plies of plastic, the flowing plastic commingling, and (6) means for moving the heated tip from the melted plastic of the plied material and permitting the melted, commingled plastic to cool to form a mixed plastic tubular weld.

4. Apparatus as in claim 3 wherein the support for the plies is a cooled platen and in which the heated plunger is metal heated to a temperature of at least one hundred degrees Farenheit above the melting temperature of the thermoplastic being joined.

5. Apparatus as in claim 3 wherein there is at least one pair of opposed plungers each movable toward and away from each other and the means for limiting the advancement of each plunger includes stop means arranged to permit each plunger tip to approach and stop adjacent a preselected meeting point.

6. Apparatus as in claim 3 in which there is provided a pressing means for smoothing the bead formed around the heated tip, said pressing means being manipulated to engage and move at least part of the bead into the cavity formed by the withdrawn tip.

7. Apparatus as in claim 4 in which the metallic plunger tip is heated to a temperature between six and seven hundred degrees Farenheit.

8. Apparatus for joining at least two plies of thermoplastic material to one another at portions other than their edges, said apparatus comprising (1) a support platen adapted to support a plurality of plies of plastic while being joined, the support platen being operated at a temperature less than the melting point of the thermoplastic sheets being joined. (2) means for holding the plies of thermoplastic material on the support platen and in substantially face-to-face relationship, (3) a held plunger having an exposed distal end with a substantially flat face and adapted to form a preselected size and shape of weld, (4) means for moving the platen and plies of thermoplastic material toward the held plunger, (5) means for limiting the approaching movement of the plies toward the plunger and to a point where the tip of the plunger is no more than adjacent the support platen, (6) means for heating the exterior tip portion of the plunger to a higher temperature than the melting temperature of thermoplastic sheets, (7) means for controlling the rate of movement of the held plies toward the plunger whereby the heated tip of the plunger when engaging the plastic plies will melt that plastic in contact with the heated tip and as the platen is moved toward the tip the melted plastic will be displaced causing a counterflow of the melted plastic up the sides of the plunger tip and simultaneously into such voids as exist between facing surfaces of the plastic, and (8) means for moving the platen and plies from the plunger tip to remove the heated tip from the melted plastic of the plied sheets whereby the melted plastic is permitted to cool and the commingled plastic forms a mixed plastic tubular weld.

9. Apparatus for joining at least two plies of thermoplastic material to one another at portions other than their edges, said apparatus comprising (1) a support platen adapted to support a plurality of plies of plastic while being joined, the support platen being operated at a temperature less than the melting point of the thermoplastic sheets being joined, (2) means for holding the plies of thermoplastic material on the support platen and in substantially face-to-face relationship, (3) a plunger having an exposed distal end with a substantially flat face and adapted to form a preselected size and shape of weld, (4) means for moving the plunger and held plies of thermoplastic material toward and away from each other, (5) means for limiting the approaching movement of plunger and plies to a point where the tip of the plunger is no more than adjacent the support platen, (6) means for heating the exterior tip portion of the plunger to a higher temperature than the melting temperature of the thermoplastic sheets, (7) means for controlling the rate of movement of the plunger and plies toward each other whereby the heated tip of the plunger when engaging the plastic plies will melt that plastic in contact with the heated tip and as the distance between tip and platen is decreased the melted plastic will be displaced causing a counterflow of the melted plastic up the sides of the plunger tip and simultaneously into such voids as exit between the facing surfaces of the plastic, and (8) means for moving the platen and plunger relative to each other to move the heated tip from the melted plastic of the plied sheets whereby the melted plastic is permitted to cool and the commingled plastic forms a mixed plastic tubular weld extending from near the bottom of the ply on the platen to and above the top ply, the weld extending laterally a short distance into such voids as exist between plies and the plastic forming the weld fused to and essentially homogeneous with the portions of plastic plies adjacent the tubular weld.

10. Apparatus for joining at least two plies of thermoplastic material to one another at portions other than their edges, said apparatus comprising (1) a support platen adapted to support a plurality of plies of plastic while being joined, the support platen being cooled and maintained at a temperature which is less than the melting point of the thermoplastic sheets being joined, (2) a clamp plate movable to and away from the platen and adapted for holding the plies of thermoplastic material on the support platen in a substantially face-to-face relationship, (3) a plunger carrying a heated tip having a substantially flat face, said plunger adapted to move toward and away from the plies of thermoplastic sheets when said sheets are carried on the support platen, (4) means for limiting the advancement of the plunger to a condition whereat the flat tip is at least no further advanced than adjacent the upper surface of the platen, (5) means for heating the exterior tip portion of the plunger to a higher temperature than the melting temperature of the thermoplastic sheet, (6) means for advancing the heated tip of the plunger at a predetermined rate into the held plies of plastic whereby the heated tip causes the contacted plastic to melt and as the tip is advanced the melted plastic up the sides of the plunger tip, the flowing plastic commingling, and (7) means for moving the plunger to withdraw the carried heated tip from the melted plastic of the plied sheets and permitting the melted plastic to cool with the commingled plastic forming a mixed plastic tubular weld extending from the bottom ply of plastic on the platen to and above the top ply of plastic, the weld fused to the portions of plastic plies adjacent the tubular weld.

11. Apparatus for joining at least two plies of thermoplastic material as in claim 10 in which the clamp plate has an aperture therein, said aperture sized and positioned for the passing therethrough of the heated plunger tip into and from the plies of plastic.

12. Apparatus for joining at least two plies of thermoplastic material as in claim 10 in which the heated tip is a bar of metal of high electrical resistance, the bar bent into a channel shape with the depending sides thereof substantially parallel and with the cross bar portion to the sides.

13. Apparatus for joining at least two plies of thermoplastic material as in claim 12 in which at least one insulating block member is disposed between the side members so as to support the sides against deflection and bending.

14. Apparatus for joining at least two plies of thermoplastic material as in claim 10 in which the heated tip is a bar of metal of high electrical resistance, the bar bent into a depending channel shape in which the side members are slightly sloped inwardly and downwardly toward each other to terminate at a cross bar normal to the mean of the side members, and in which an insulating block member is disposed between the side members so as to support the sides against deflection and bending.

No references cited.

DOUGLAS J. DRUMMOND, Primary Examiner

UNITED STATES PATENT OFFICE
CERTIFICATE OF CORRECTION

Patent No. 3,484,855        Dated December 16th, 1969

Inventor(s) W.E. YOUNG, PATRICK J. PINTO AND ROBERT O. WOLFELSPERG

It is certified that error appears in the above-identified patent and that said Letters Patent are hereby corrected as shown below:

Col. 2, line 31, "basic" should read -- plastic --;

Col. 9, line 7, "setrength" should read -- strength --;

Col. 12, line 26, "exit" should read -- exist --

Col. 12, line 61, after "plastic" should be inserted -- is displaced causing a counterflow of the melted plastic --;

Col. 13, line 4, after "portion" should be inserted -- normal --

SIGNED AND
SEALED
MAY 5 1970

(SEAL)
Attest:

Edward M. Fletcher, Jr.
Attesting Officer

WILLIAM E. SCHUYLER, JR.
Commissioner of Patents